United States Patent Office 3,038,920
Patented June 12, 1962

3,038,920
S-(10-PHENOXARSINYL) O,O-(DI-SUBSTITUTED) PHOSPHORODITHIOATES
Joseph E. Dunbar, Midland, Mich., assignor to The Dow Chemical Company, Midland, Mich., a corporation of Delaware
No Drawing. Filed May 27, 1960, Ser. No. 32,121
4 Claims. (Cl. 260—440)

This invention is directed to S-(10-phenoxarsinyl) O,O-(di-substituted) phosphorodithioates corresponding to the formula

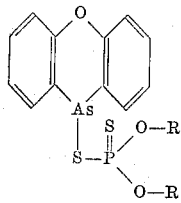

In this and succeeding formulae, each R represents lower alkyl, phenyl, halophenyl, lower alkyl-halophenyl, benzyl, halobenzyl, lower alkyl-halobenzyl. In the present specification and claims, lower alkyl is employed to refer to the alkyl radicals containing from 1–5 carbon atoms, inclusive. These compounds are liquid or crystalline solid materials which are somewhat soluble in many common organic solvents and of very low solubility in water. The compounds are useful as parasiticides and are adapted to be employed as active toxicants of compositions for the control of ascarids, mite, insect, bacterial and fungal organisms such as ticks, aphids, beetles, worms and *Rhizoctonia solani*. The compounds are also useful as herbicides for the control of a number of undesirable grass and weed species.

The compounds of the present invention may be prepared by reacting 10,10'-oxybisphenoxarsine with an O, O-(di-substituted) phosphorodithioic acid corresponding with the formula

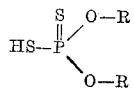

Representative acids include the O,O-(dialkyl) phosphorodithioic acids, O,O-(diaryl) phosphorodithioic acids, O,O-di(haloalkyl) phosphorodithioic acids, O-alkyl O-aryl phosphorodithioic acids, O,O-di(haloaryl) phosphorodithioic acids, O-alkyl O-haloaryl phosphorodithioic acids, O-alkyl O-halobenzyl phosphorodithioic acids, O-haloalkyl O-halophenyl phosphorodithioic acids and O-haloalkyl O-benzyl phosphorodithioic acids.

The reaction conveniently is carried out in the presence of an inert organic liquid such as toluene, benzene or xylene as reaction medium. The amounts of the reagents to be employed is not critical, some of the desired products being obtained when employing any proportion of the reactants. In the preferred method of operation, good results are obtained when employing about one molecular proportion of the 10,10'-oxybisphenoxarsine with about two molecular proportions of the phosphorodithioic acid reactants. The reaction takes place smoothly at the temperature range of from 20° to 150° C. with the production of the desired product and water of reaction. In carrying out the reaction, the 10,10'-oxybisphenoxarsine and acid reactant are mixed and contacted together in any convenient fashion and the resulting mixture thereafter maintained for a period of time in the reaction temperature range to complete the reaction.

Upon completion of the reaction, any reaction medium may be removed from the reaction mixture by evaporation or distillation under reduced pressure to obtain the desired product as a residue. The latter may be further purified by conventional procedures such as washing, extraction and recrystallization.

In an alternative method the new compounds may be prepared by reacting 10-chlorophenoxarsine or 10-bromophenoxarsine with an alkali metal or ammonium salt of an acid corresponding with the formula

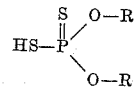

The reaction conveniently is carried out in a liquid material as reaction medium, such as benzene, xylene or acetone. The exact amounts of the 10-halophenoxarsine and acid salt of reagent to be employed are not critical, some of the desired products being obtained when employing any proportions of ingredients. In the preferred method of operations, about one molecular proportion of 10-halophenoxarsine is reacted with one molecular proportion of the acid salt reagent. The reaction takes place readily at the temperature range of from 20 to 150° C. with the production of the desired product and alkali metal halide of reaction. In carrying out the reaction, the 10-halophenoxarsine and alkali metal salt of the acid, such as the sodium or potassium salt, are mixed and contacted together in any convenient fashion and maintained for a period of time at a temperature of from 90 to 150° C. to complete the reaction. Following the reaction, the desired product may be separated by conventional procedures such as washing with water, filtration and decantation and recrystallization from common organic solvents.

The following examples merely illustrate the invention and are not to be construed as limiting.

EXAMPLE 1

S-(10-Phenoxarsinyl) O,O-Diethyl Phosphorodithioate

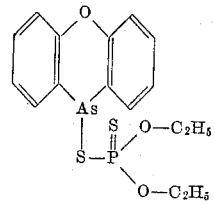

10,10'-oxybisphenoxarsine (20.1 grams; 0.04 mole) and 15.3 grams (0.0821 mole) of O,O-diethylphosphorodithioic acid were dispersed in 250 milliliters of benzene and the resulting mixture heated with stirring for 1.25 hours at the boiling temperature and under reflux. The benzene was then removed from the reaction mixture by evaporation under vacuum and the residue successively crystallized from nitromethane. As a result of these operations, there was obtained an S-(10-phenoxarsinyl) O,O-diethylphosphorodithioate product melting at 63.5°–64° C. and having carbon, hydrogen and sulfur contents of 44.82, 4.07 and 15.07 percent, respectively, as compared to theoretical contents of 44.86, 4.24 and 14.97 percent.

EXAMPLE 2

S-(10-Phenoxarsinyl) O,O-Diisopropyl Phosphorodithioate 10-chlorophenoxarsine (5.0 grams; 0.018 mole) was dissolved in 75 milliliters of acetone and the resulting solution added rapidly with stirring to 3.83 grams (0.018 mole) of potassium O,O-diisopropyl phosphorodithioate dissolved in 25 milliliters of water. Stirring was thereafter continued and the mixture raised to the boiling temperature for 15 minutes, and thereafter cooled and diluted with 300 milliliters of ice water. Following the dilution, the mixture was extracted with diethyl ether, and the ether extract dried over anhydrous magnesium sulfate. The ether was then removed from the extract by evaporation under vacuum and the residue diluted with cyclohexane and filtered. The cyclohexane was then removed from the filtrate by evaporation under vacuum, and the residue successively recrystallized from a petroleum ether (B.P. 60°–70° C.). As a result of these operations, there was obtained an S-(10-phenoxarsinyl) O,O-diisopropyl phosphorodithioate product melting at 61°–61.5° C. and having carbon, hydrogen and sulfur contents of 47.57, 4.92 and 14.2 percent, respectively, as compared to theoretical contents of 47.37, 4.86 and 14.05 percent.

EXAMPLE 3

S-(10-Phenoxarsinyl) O,O-Di-Sec.-Butyl Phosphorodithioate

Ammonium O,O-di-sec.-butyl phosphorodithioate (26.4 grams; 0.102 mole) in 133 milliliters of water was added rapidly with stirring to 27.8 grams (0.1 mole) of 10-chlorophenoxarsine dispersed in 400 milliliters of acetone. Stirring was thereafter continued and the mixture heated to the boiling temperature for 15 minutes with the addition of sufficient acetone to effect complete solution of the reagents. The reaction mixture was then treated with activated charcoal, filtered, cooled and the filtrate diluted with 1250 milliliters of water. Following the dilution, the diluted mixture was extracted with diethyl ether and the ether extract dried over anhydrous magnesium sulfate. The ether was then removed from the extract by evaporation under vacuum to obtain an S-(10-phenoxarsinyl) O,O-di-sec.-butyl phosphorodithioate product as a liquid material having a refractive index $n/D$ of 1.6430 at 20° C.

In a similar manner, other S-(10-phenoxarsinyl) O,O-(di-substituted) phosphorodithioates are prepared as follows:

S-(10-phenoxarsinyl) O,O-diphenyl phosphorodithioate by reacting 10-chlorophenoxarsine with sodium diphenyl phosphorodithioate.

S-(10-phenoxarsinyl) O-(2,4,5-trichlorophenyl) O-methyl phosphorodithioate by reacting 10-chlorophenoxarsine with sodium O-(2,4,5-trichlorophenyl) O-methyl phosphorodithioate.

S-(10-phenoxarsinyl) O,O-di(methyl) phosphorodithioate by reacting 10-bromophenoxarsine with potassium O,O-di(methyl) phosphorodithioate.

S-(10-phenoxarsinyl) O-(4-chlorophenyl) O-methyl phosphorodithioate by reacting 10-chlorophenoxarsine with sodium O-(4-chlorophenyl) O-methyl phosphorodithioate.

S-(10-phenoxarsinyl) O,O-dibenzyl phosphorodithioate by reacting 10,10-oxybisphenoxarsine with O,O-dibenzyl phosphorodithioic acid.

S-(10-phenoxarsinyl) O-(2,4-dibromobenzyl) O-propyl phosphorodithioate by reacting 10-chlorophenoxarsine with sodium O-(2,4-dibromobenzyl) O-propyl phosphorodithioate.

S-(10-phenoxarsinyl) O-(2-chloro-4-tertiarybutylphenyl) O-methyl phosphorodithioate by reacting 10-chlorophenoxarsine with sodium O-(2-chloro-4-tertiarybutylphenyl) O-methyl phosphorodithioate.

S-(10-phenoxarsinyl) O,O-di(3,4-dichlorophenyl) phosphorodithioate by reacting 10-chlorophenoxarsine with sodium O,O-di(3,4-dichlorophenyl) phosphorodithioate.

S-(10-phenoxarsinyl) O-(4-bromo-2-methylbenzyl) O-(ethyl) phosphorodithioate by reacting 10-chlorophenoxarsine with sodium O-(4-bromo-2-methylbenzyl) O-ethyl phosphorodithioate.

S-(10-phenoxarsinyl) O,O-di(5-chloro-3-methylphenyl) phosphorodithioate by reacting 10-chlorophenoxarsine with sodium O,O-di(5-chloro-3-methylphenyl) phosphorodithioate.

S-(10-phenoxarsinyl) O-(2,4-dichloro-6-methylphenyl) O-methyl phosphorodithioate by reacting 10-chlorophenoxarsine with sodium O-(2,4-dichloro-6-methylphenyl) O-methyl phosphorodithioate.

S-(10-phenoxarsinyl) O-(2,3,4,5-tetrachlorophenyl) O-methyl phosphorodithioate by reacting 10-chlorophenoxarsine with sodium O-(2,3,4,5-tetrachlorophenyl) O-methyl phosphorodithioate.

The novel compounds of the present invention are useful as parasiticides for the control of a number of pests and the inhibition of the growth of a number of weed and plant species. For such uses, the products may be dispersed on an inert finely divided solid and employed as dusts. Such mixtures may also be dispersed in water with or without the aid of a surface active agent and employed as sprays. In other procedures, the products may be employed as active constituents in solvent solutions, oil-in-water or water-in-oil emulsions, or aqueous dispersions. In representative operations, aqueous compositions containing 1000 parts per million by weight of S-(10-phenoxarsinyl) O,O-diethyl phosphorodithioate give excellent controls of southern army worms, crab grass, salvinia and coontail. In further operations, the compounds of the present invention have been found of outstanding value for the preservation of wood.

The O,O-(di-substituted) phosphorodithioic acids employed as starting materials in accordance with the teachings of the present invention may be prepared in accordance with known procedures wherein phosphorus pentasulfide $P_2S_5$ is reacted with a hydroxyl compound, ROH, or an equimolecular mixture of two ROH compounds (U.S. 2,542,604). When employing the mixture of two ROH compounds, a diester dithiophosphoric acid product is obtained containing different esterifying moieties. Good results are obtained when one molecular proportion of phosphorus pentasulfide is reacted with a total of four molecular proportions of the hydroxy compound or mixture of hydroxy compounds. The O,O-(di-substituted) phosphorodithioic acids contain an acidic group which reacts to form the alkali metal or ammonium salts to be employed in accordance with the methods herein described.

I claim:

1. The S-(10-phenoxarsinyl) O,O-(di-substituted) phosphorodithioates corresponding to the formula

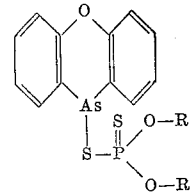

wherein each R is independently selected from the group consisting of lower alkyl, halo-lower alkyl, phenyl, halophenyl, lower alkyl-halophenyl, benzyl, halobenzyl, and lower alkyl-halobenzyl.

2. S-(10-phenoxarsinyl) O,O-diethyl phosphorodithioate.

3. S-(10-phenoxarsinyl) O,O-diisopropyl phosphorodithioate.

4. S-(10-phenoxarsinyl) O,O-di-sec.-butyl phosphorodithioate.

References Cited in the file of this patent

FOREIGN PATENTS

F14,431   Germany _____ Sept. 29, 1955
          (IVc/120)

OTHER REFERENCES

Chem. Abstracts, vol. 15, pp. 1720–21.